US008824848B1

(12) United States Patent
Enomoto et al.

(10) Patent No.: US 8,824,848 B1
(45) Date of Patent: Sep. 2, 2014

(54) MULTIMODE OPTICAL FIBER INCLUDING A CORE AND A CLADDING

(71) Applicant: Sumitomo Electric Industries, Ltd., Osaka (JP)

(72) Inventors: Tadashi Enomoto, Yokohama (JP); Kazuhiro Yonezawa, Yokohama (JP); Sumio Hoshino, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/913,897

(22) Filed: Jun. 10, 2013

(51) Int. Cl.
*G02B 6/28* (2006.01)

(52) U.S. Cl.
USPC .......................................................... 385/124

(58) Field of Classification Search
CPC ............................. G02B 6/0285; G02B 6/0286
USPC ........................................................... 385/124
See application file for complete search history.

(56) References Cited

U.S. PATENT DOCUMENTS

| 6,292,612 | B1 | 9/2001 | Golowich et al. | |
|---|---|---|---|---|
| 6,438,303 | B1 * | 8/2002 | Abbott et al. | 385/123 |
| 7,787,731 | B2 | 8/2010 | Bookbinder et al. | |
| 7,903,918 | B1 | 3/2011 | Bickham et al. | |
| 8,280,213 | B2 | 10/2012 | Molin et al. | |
| 2002/0146224 | A1 * | 10/2002 | Abbott et al. | 385/124 |
| 2003/0180019 | A1 * | 9/2003 | Tirloni | 385/127 |
| 2005/0031262 | A1 * | 2/2005 | Hisatomi et al. | 385/33 |
| 2005/0053351 | A1 * | 3/2005 | Guan et al. | 385/142 |
| 2005/0180709 | A1 * | 8/2005 | Park et al. | 385/124 |
| 2005/0220431 | A1 * | 10/2005 | Hainberger et al. | 385/124 |
| 2011/0044596 | A1 | 2/2011 | Zhang et al. | |
| 2011/0135262 | A1 * | 6/2011 | Molin et al. | 385/124 |
| 2011/0243519 | A1 | 10/2011 | Jiang et al. | |
| 2011/0305423 | A1 | 12/2011 | Molin et al. | |
| 2012/0039361 | A1 | 2/2012 | Gooijer et al. | |
| 2012/0195561 | A1 * | 8/2012 | Molin et al. | 385/124 |

* cited by examiner

*Primary Examiner* — Mark Robinson
*Assistant Examiner* — Zachary A Nemtzow
(74) *Attorney, Agent, or Firm* — Drinker Biddle & Reath LLP

(57) ABSTRACT

The present invention relates to a multimode optical fiber having a stably manufacturable structure as a transmission medium suitable for wide-band multimode transmission. In the multimode optical fiber, a core has a refractive-index profile a shape of which is defined by the exponent α which varies along a radial direction from a center of the core and an average of radial variation of which is positive in a predetermined range in the radial direction.

9 Claims, 6 Drawing Sheets

Fig.5

| α(25) at periphery of core | α(0) at center of core | | | | | | | |
|---|---|---|---|---|---|---|---|---|
| | 2.00 | 2.01 | 2.02 | 2.03 | 2.04 | 2.05 | 2.06 | 2.07 |
| 2.00 | 0.564 | | | | | | | |
| 2.01 | 0.649 | 0.723 | 0.836 | 0.879 | 0.921 | 0.986 | 1.013 | 0.993 |
| 2.02 | 0.921 | 0.926 | 0.988 | 1.067 | 1.278 | 1.323 | 1.105 | 1.048 |
| 2.03 | 1.050 | 1.132 | 1.358 | 1.483 | 1.488 | 1.356 | 1.142 | 1.061 |
| 2.04 | 1.367 | 1.531 | 1.564 | 1.552 | 1.408 | 1.199 | 1.131 | 0.995 |
| 2.05 | 1.576 | 1.579 | 1.463 | 1.380 | 1.250 | 1.156 | 0.994 | 0.808 |
| 2.06 | 1.404 | 1.386 | 1.313 | 1.245 | 1.147 | 0.953 | 0.805 | 0.762 |
| 2.07 | 1.277 | 1.245 | 1.106 | 0.991 | 0.857 | 0.799 | 0.746 | 0.651 |

AR1 (pointing to 1.579)

Fig.6

| α(25) at periphery of core | α(0) at center of core | | | | | | | |
|---|---|---|---|---|---|---|---|---|
| | 2.00 | 2.01 | 2.02 | 2.03 | 2.04 | 2.05 | 2.06 | 2.07 |
| 2.00 | 0.509 | | | | | | | |
| 2.01 | 0.584 | 0.663 | 0.764 | 0.888 | 1.082 | 1.312 | 1.573 | 1.571 |
| 2.02 | 0.692 | 0.797 | 0.929 | 1.128 | 1.376 | 1.715 | 1.791 | 1.677 |
| 2.03 | 0.835 | 0.974 | 1.176 | 1.433 | 1.765 | 2.013 | 1.862 | 1.684 |
| 2.04 | 0.983 | 1.212 | 1.479 | 1.782 | 2.063 | 2.014 | 1.828 | 1.517 |
| 2.05 | 1.134 | 1.422 | 1.759 | 2.017 | 2.105 | 1.919 | 1.600 | 1.255 |
| 2.06 | 1.300 | 1.628 | 1.898 | 2.077 | 1.879 | 1.622 | 1.267 | 1.016 |
| 2.07 | 1.447 | 1.656 | 1.796 | 1.698 | 1.484 | 1.226 | 0.992 | 0.834 |

AR2

MULTIMODE OPTICAL FIBER INCLUDING A CORE AND A CLADDING

BACKGROUND OF THE INVENTION

1. Field of the Invention

The present invention relates to a multimode optical fiber.

2. Related Background Art

The multimode optical fibers allow easy splicing between fibers and easy construction of networks and therefore are commonly used in application of short-haul information transmission like a LAN (Local Area Network).

In recent years, studies have been actively conducted on improvement in bending resistance and expansion of communication bandwidth (implementation of wider band) for the foregoing multimode optical fibers, for example, for the purpose of improvement in fiber handling, as well as studies on fast transmission in the foregoing short-haul information transmission. A variety of shapes of refractive-index profiles in the multimode optical fibers are introduced for improvement in optical characteristics including such bending resistance and communication bandwidth, in U.S. Pat. No. 6,292,612 (Patent Literature 1), U.S. Pat. No. 7,787,731 (Patent Literature 2), U.S. Pat. No. 7,903,918 (Patent Literature 3), U.S. Pat. No. 8,184,936 (Patent Literature 4), U.S. Pat. No. 8,280,213 (Patent Literature 5), U.S. Pat. Published Application No. 2011/0243519 (Patent Literature 6), U.S. Pat. Published Application No. 2012/0039361 (Patent Literature 7), and U.S. Pat. Published Application No. 2011/0305423 (Patent Literature 8).

SUMMARY OF THE INVENTION

The Inventors conducted research on technologies for stably manufacturing the multimode optical fibers suitable for wide-band multimode optical transmission in order to realize faster short-haul information transmission than before, as described below. In the present specification, a simple expression of "optical fiber" without any specific note shall mean "multimode optical fiber."

There are recent demands for further increase in speed of short-haul information transmission in data centers using the multimode optical fibers and it is then necessary, particularly, to stably manufacture optical fibers satisfying OM3 and OM4 Standards of ISO/IEC11801. On the other hand, in order to stably manufacture the multimode optical fibers suitable for wide-band multimode transmission, a refractive-index profile in a core needs to accurately coincide with a desired shape.

The shape of the refractive-index profile in the core is defined by the exponent α and this exponent α is usually one selected from numerical values in the range of 1.9 to 2.3. Specifically, a maximum relative refractive-index difference $\Delta_{core}$ of the core (maximum refractive index at the center: $n_1$) relative to a cladding (refractive index: $n_0$) is given by Expression (1) below and the refractive-index profile n(r) of the core, which is defined by distance r from the center of the core having the radius a, is given by Expression (2) below. In each of the foregoing Patent Literatures 1 to 8, the exponent α that defines the shape of this refractive-index profile n(r) is handled as a constant.

$$\Delta_{core} = \frac{(n_1^2 - n_0^2)}{2n_1^2} \quad (1)$$

$$n(r) = n_1 \left(1 - 2\Delta_{core}\left(\frac{r}{a}\right)^\alpha\right)^{\frac{1}{2}} \quad (2)$$

There was, however, a limit to implementation of a further wider bandwidth of the multimode optical fiber by simply selecting the exponent α as a constant. In addition, the refractive-index profile of the actually-produced multimode optical fiber can deviate from the designed refractive-index profile and in this case, mode dispersion caused by the manufacturing error of the refractive-index profile becomes a factor to impede the implementation of wider bandwidth. For this reason, it was difficult to stably manufacture the multimode optical fiber suitable for wide-band multimode transmission, i.e., to stabilize the wide-band performance of the produced multimode optical fiber.

The present invention has been accomplished to solve the above problem and it is an object of the present invention to provide a multimode optical fiber having a stably manufacturable structure as a transmission medium for wide-band multimode transmission.

In order to solve the above problem, a multimode optical fiber according to the present invention, as a first aspect, comprises a core extending along a predetermined axis, and a cladding provided on an outer peripheral surface of the core. The core has a maximum refractive index $n_1$ at a center thereof and an outer diameter 2a. The cladding has a refractive index $n_0$ ($<n_1$) at an interface to the core. Particularly, in a cross section of the multimode optical fiber perpendicular to the predetermined axis, the core in the first aspect has a refractive-index profile n(r) a shape of which is defined by an exponent α(r) that varies with a distance r (0≤r≤a) in a radial direction from the center of the core. In the cross section of the multimode optical fiber perpendicular to the predetermined axis, an average of variation d(α(r))/dr of the exponent along the radial direction satisfies Expression (3) below in a standard range in which the distance r is not less than 0.4 a and not more than 0.6 a.

$$\overline{\frac{d}{dr}\alpha(r)} > 0 \quad (3)$$

As a second aspect applicable to the first aspect, the exponent α(0) at the center of the core is preferably not more than 2.04. This is because a sufficient adjustment margin can be ensured even in a general numerical range of the exponent in a GI type refractive-index profile.

As a third aspect applicable to at least either one of the first and second aspects, the average of variation of the exponent is preferably defined by an average of variations d(α($r_i$))/dr of the exponent at two or more arbitrary points distant by a distance $r_i$ (i is a positive integer) in the standard range from the center of the core. Namely, when the number of the arbitrary points whose distance from the center of the core is within the standard range is k (k is an integer of not less than 2), the average of variations of the exponent in the radial direction is defined by Expression (4) below.

$$\overline{\frac{d}{dr}\alpha(r)} = \frac{1}{k}\sum_{i=1}^{k}\frac{d}{dr}\alpha(r_i) \quad (4)$$

As a fourth aspect applicable to at least any one of the first to third aspects, when $\Delta_{core}$ represents a maximum relative refractive-index difference of the core with respect to the refractive index $n_0$ of the cladding and when $\Delta(r)$ represents a relative refractive-index difference of the core at a position distant by the distance r from the center of the core, with respect to the refractive index $n_0$ of the cladding, the exponent $\alpha(r)$ at the distance r from the center of the core is defined by Expression (5) below;

$$\alpha(r) = \frac{r\left(-\frac{d}{dr}\Delta(r)\right)}{\Delta core - \Delta(r)} \quad (5)$$

where $\Delta_{core} = \frac{(n_1^2 - n_0^2)}{2n_1^2}$ and $\Delta(r) = \frac{(n(r)^2 - n_0^2)}{2n(r)^2}$.

As a fifth aspect applicable to at least any one of the first to fourth aspects, the average of variation $d(\alpha(r))/dr$ of the exponent along the radial direction preferably satisfies the above Expression (3) in a range of 0.3 a≤r≤0.7 a. Furthermore, as a sixth aspect applicable to at least any one of the first to fifth aspects, the average of variation $d(\alpha(r))/dr$ of the exponent along the radial direction more preferably satisfies the above Expression (3) in a range of 0.2 a≤r≤0.8 a.

For realizing the multimode optical fiber satisfying the standard optical fiber specifications for optical interconnection, as a seventh aspect applicable to at least any one of the first to sixth aspects, the outer diameter 2a of the core is preferably not less than 48 μm and not more than 52 μm when a basic diameter is 50 μm. With the same purport, as an eighth aspect applicable to at least any one of the first to seventh aspects, the multimode optical fiber preferably has NA of not less than 0.195 and not more than 0.230.

Furthermore, for realizing wide-band multimode transmission of OM3 and higher Standards, as a ninth aspect applicable to at least any one of the first to eighth aspects, the multimode optical fiber preferably has an OFL bandwidth of not less than 1500 MHz-km in the 850 nm band. With the same purport, as a tenth aspect applicable to at least any one of the first to ninth aspects, the multimode optical fiber preferably has minEMBc of not less than 2000 MHz.km in the 850 nm band.

In passing, a multimode optical fiber satisfying OM3 Standard refers to a fiber that has the bandwidth called Minimum Effective Modal Bandwidth (minEMB), of not less than 2000 MHz.km and the bandwidth in over-filled launch (OFL bandwidth defined by International Standards IEC60793-1-41) of not less than 1500 MHz.km at 850 nm and not less than 500 MHz.km at 1300 nm. In the present specification, a minimum of Calculated Effective Modal Bandwidth is represented by "minEMBc." In OM3 Standard, the multimode optical fiber needs to satisfy the three conditions (OM3-1 to OM3-3) below.
(OM3-1) minEMBc (850 nm)≥2000 MHz.km
(OM3-2) OFL bandwidth (850 nm)≥1500 MHz.km
(OM3-3) OFL bandwidth (1300 nm)≥500 MHz.km
In OM4 Standard, the multimode optical fiber needs to satisfy the three conditions (OM4-1 to OM4-3) below.
(OM4-1) minEMBc (850 nm)≥4700 MHz.km
(OM4-2) OFL bandwidth (850 nm)≥3500 MHz.km
(OM4-3) OFL bandwidth (1300 nm)≥500 MHz.km Each of embodiments according to the present invention will become more fully understood from the detailed description given hereinbelow and the accompanying drawings.

These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

BRIEF DESCRIPTION OF THE DRAWINGS

FIG. 5 is a table showing the OFL bandwidths (GHz.km) in the 850 nm band for various samples of different combinations of the exponent α(0) at the core center and the exponent α(a) at the core periphery.

FIG. 6 is a table showing minEMBc (GHz.km) in the 850 nm band for various samples of different combinations of the exponent α(0) at the core center and the exponent α(a) at the core periphery.

DETAILED DESCRIPTION OF EMBODIMENTS

Each of embodiments of the multimode optical fiber according to the present invention will be described below in detail with reference to the accompanying drawings. The same elements will be denoted by the same reference signs in the description of the drawings, without redundant description.

Figure 1A:
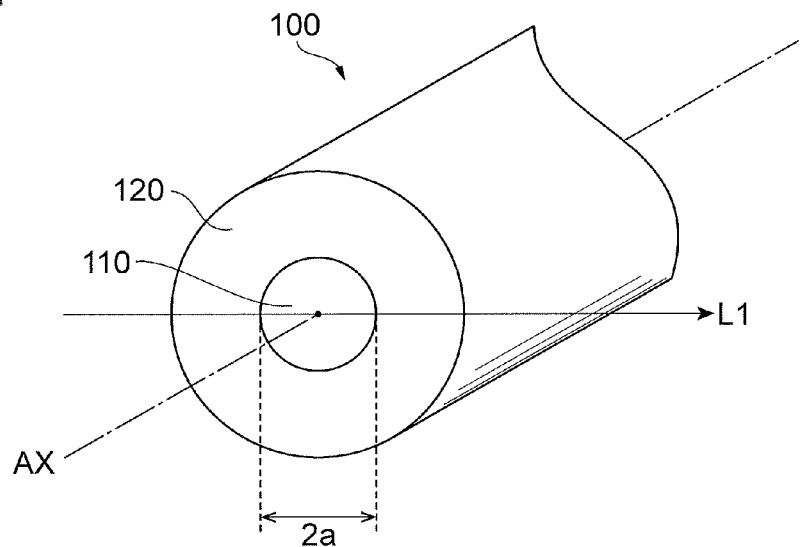
FIG. 1A is a drawing showing an example of sectional structure of a multimode optical fiber according to an embodiment of the present invention, and FIG. 1B a refractive-index profile thereof.

FIG. 1A is a drawing showing an example of sectional structure of the multimode optical fiber according to an embodiment of the present invention. The multimode optical fiber 100 shown in FIG. 1A is provided with a core 110 consisting primarily of silica glass and extending along a predetermined axis (optical axis AX), and a cladding 120 provided on an outer peripheral surface of the core 110. The core 110 has an outer diameter 2a and takes a maximum refractive index $n_1$ at a center thereof (which is a position coincident with the optical axis AX). The cladding 120 has a refractive index $n_0$ lower than the maximum refractive index $n_1$ of the core 110, at an interface to the core 110.

Figure 1B:
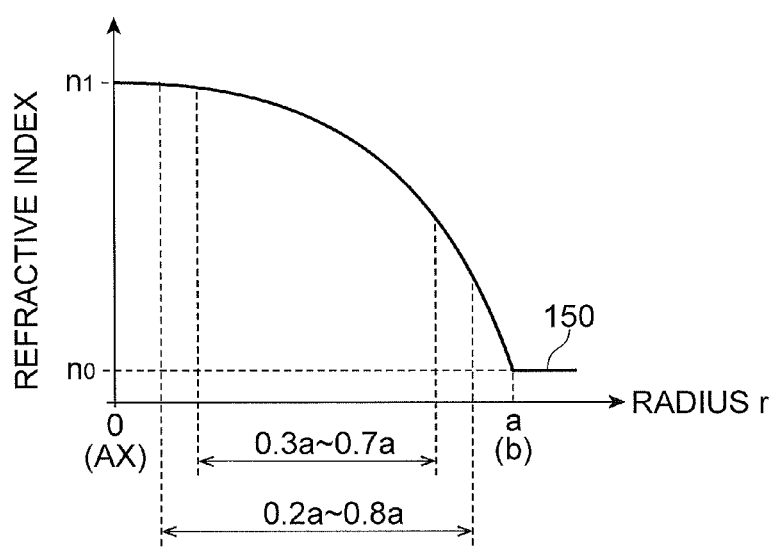

The multimode optical fiber 100 has a refractive-index profile 150 shown in FIG. 1B. The refractive-index profile 150 shown in FIG. 1B shows refractive indices of respective parts on a line L1 perpendicular to the optical axis AX in FIG. 1A and corresponds to the refractive-index profile along the radial direction of the multimode optical fiber 100. More specifically, a region from the core center (coincident with the optical axis AX) to the radius r=a is a region corresponding to the core 110 and a region with the radius r>a is a region corresponding to the cladding 120.

Figure 2:
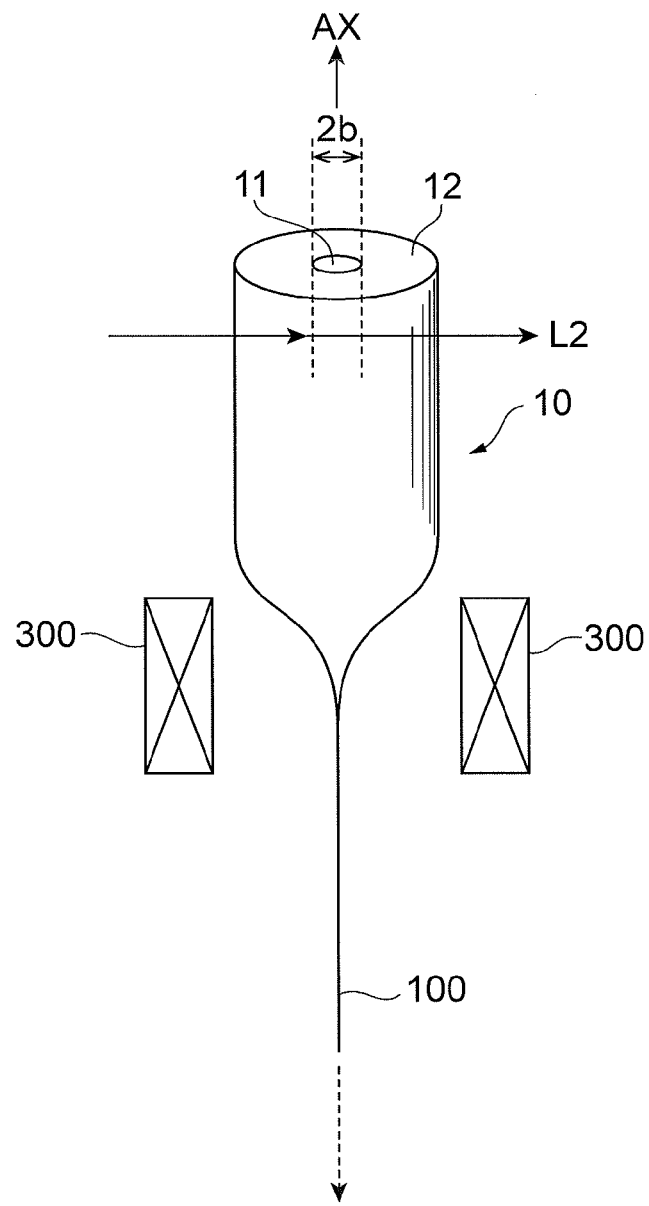
FIG. 2 is a drawing showing a manufacturing process for obtaining the multimode optical fiber according to the embodiment.

The multimode optical fiber 100 having the refractive-index profile 150 shown in FIG. 1B is obtained, as shown in FIG. 2, by drawing one end of an optical fiber preform 10 while heating and melting it by a heater 300. Therefore, the optical fiber preform 10 also has the same shape as the refractive-index profile 150 shown in FIG. 1B. Specifically, in FIG. 2, the optical fiber preform 10 has a first region 11 with an outer diameter 2b which will become the core 110 after the drawing, and a second region 12 which will become the cladding 120 after the drawing, and the shape of the refractive-index profile thereof is approximately coincident with the shape of the refractive-index profile 150 shown in FIG. 1B.

In the present embodiment, the exponent α that defines the refractive-index profile n(r) of the multimode optical fiber 100 (or the optical fiber preform 10) shown in FIG. 1B, is handled as a variable of the radius r. Namely, the maximum relative refractive-index difference $\Delta_{core}$ of the core 110 (maximum refractive index at the center: $n_1$) relative to the cladding 120 (refractive index: $n_0$) is given by Expression (6) below and the refractive-index profile n(r) of the core 110 that is defined by the distance r from the center of the core 110 having the radius a is given by Expression (7) below. In general, the refractive-index profile of optical fiber can be measured by the RNFP method and the refractive-index profile of optical fiber preform can be measured using a preform analyzer.

$$\Delta_{core} = \frac{(n_1^2 - n_0^2)}{2n_1^2} \quad (6)$$

$$n(r) = n_1\left(1 - 2\Delta_{core}\left(\frac{r}{a}\right)^{\alpha(r)}\right)^{\frac{1}{2}} \quad (7)$$

Particularly, in the present embodiment, an average of variation d (α(r))/dr of the exponent α along the radial direction satisfies Expression (8) below in an effective range of 0.4 a≤r≤0.6 a in the refractive-index profile 150 shown in FIG. 1B.

$$\overline{\frac{d}{dr}\alpha(r)} > 0 \quad (8)$$

The foregoing average of variation of the exponent α is defined by Expression (9) below where the number of arbitrary points in the effective range of 0.4 a≤r≤0.6 a is k (k is an integer of not less than 2).

$$\overline{\frac{d}{dr}\alpha(r)} = \frac{1}{k}\sum_{i=1}^{k}\frac{d}{dr}\alpha(r_i) \quad (9)$$

As an example of the exponent α given as a function of the radius r, the exponent α(r) is defined by Expression (10) below where $\Delta_{core}$ represents the maximum relative refractive-index difference of the core 110 with respect to the refractive index $n_0$ of the cladding 120 at the interface to the core 110 and Δ(r) the relative refractive-index difference of the core 110 with respect to the refractive index $n_0$ of the cladding 120, at the distance r from the center of the core 110.

$$\alpha(r) = \frac{r\left(-\frac{d}{dr}\Delta(r)\right)}{\Delta_{core} - \Delta(r)} \quad (10)$$

In this equation, $\Delta_{core} = \frac{(n_1^2 - n_0^2)}{2n_1^2}$ and $\Delta_{(r)} = \frac{(n(r)^2 - n_0^2)}{2n(r)^2}$.

It is also possible to estimate α(0) and α(r=a), by calculating a linear approximate equation from values α($r_i$) of the exponent α at two or more arbitrary points distant by distance $r_i$ within the effective range of the radius r from the center of the core. Therefore, the exponent α satisfying the foregoing Expression (8) can also be calculated in the case using the linear approximation as described above.

In the multimode optical fiber (or the optical fiber preform) manufactured in practice, design errors become relatively large near the center of the core and near the periphery of the core (or near the boundary between the core and the cladding) and it is thus sometimes difficult to obtain an accurate refractive-index profile. In the present embodiment, then, the lower limit of the aforementioned effective range (the boundary on the core center side) is set in the range of 0.2a to 0.4a and the upper limit of the effective range (the boundary on the core periphery side) is set in the range of 0.6a to 0.8a.

FIG. 1B shows the refractive-index profile of the standard multimode optical fiber but the refractive-index profiles for achieving the effect by the present embodiment are not limited to the example of FIG. 1B. In fact, various refractive-index profiles 150A to 150E shown in FIGS. 3A to 3E are applicable to the multi core multimode optical fiber 100 of the present embodiment.

Figure 3A:
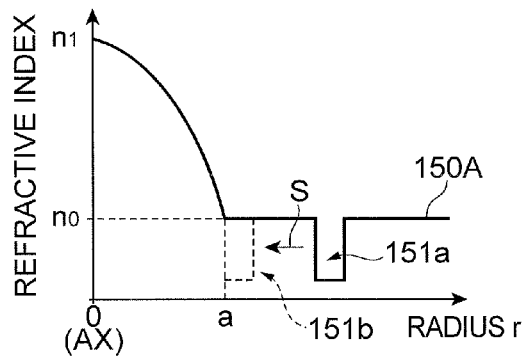
FIGS. 3A to 3E are drawings showing various refractive-index profiles applicable to the core in the multimode optical fiber according to the embodiment.
Figure 3B:
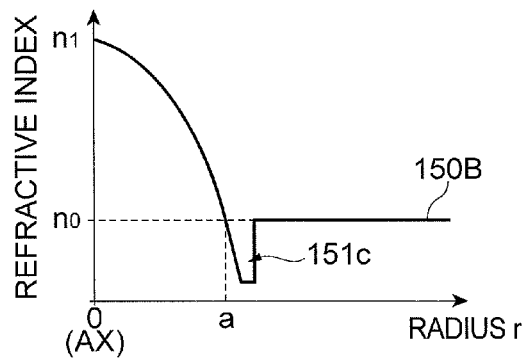
Figure 3D:
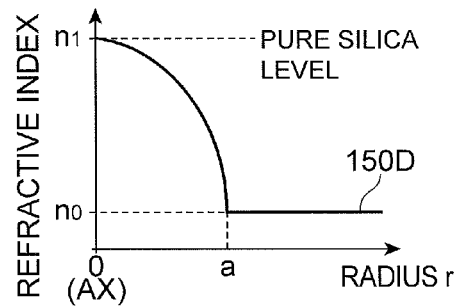
Figure 3C:
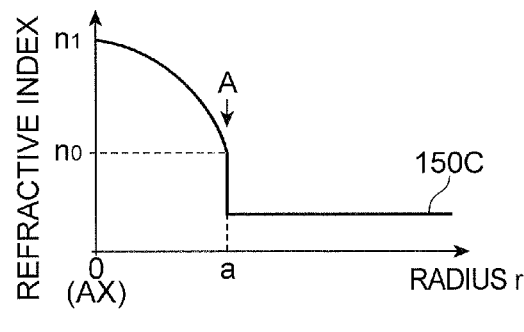
Figure 3E:
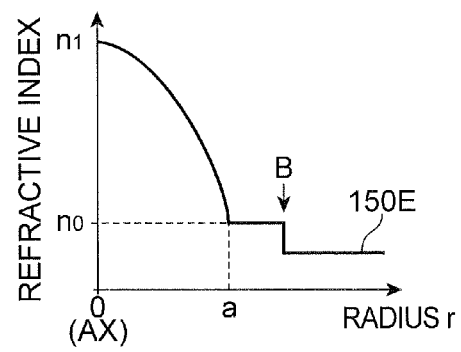

For example, FIG. 3A shows the refractive-index profile 150A suitable for bend-insensitive multimode optical fibers, having a trench layer 151a in an outer peripheral region around the core, like the refractive-index profiles shown in the aforementioned Patent Literatures 2 and 3. The position of the trench layer may be moved along an arrow S shown in FIG. 3A and in this case, the refractive-index profile 150A has a trench layer 151b in contact with the core. FIG. 3B shows the refractive-index profile 150B of a shape in which the refractive-index profile (alpha-power profile) in the core defined by the exponent α is kept to continuously vary to the bottom of a trench layer 151c adjacent thereto. FIG. 3C shows the refractive-index profile 150C of a shape in which the outside of the core (the boundary between the core and the cladding) rises up sheer like a cliff A, like the refractive-index profile shown in the aforementioned Patent Literature 5. FIG. 3D shows the refractive-index profile 150D in which the alpha-power profile is formed in the core by doping with fluorine, like the refractive-index profile shown in the aforementioned Patent Literature 7. Furthermore, FIG. 3E shows the refractive-index profile 150E in which a step B is formed in the cladding, like the refractive-index profile shown in the aforementioned Patent Literature 4.

FIG. 1B shows the refractive-index profile 150 of the multimode optical fiber 100 (core composition: $GeO_2$—$SiO_2$) formed by doping the core 110 with $GeO_2$, but the core 110 may be comprised of the core of another composition (e.g., one of other compositions such as $GeO_2$—$SiO_2$-$P_2O_5$, $GeO_2$—$SiO_2$-F, and $GeO_2$—$P_2O_5$—$SiO_2$-F). In any case, however, the core 110 has the refractive-index profile n(r) the shape of which is defined by the exponent α(r) varying with the distance r (0≤r≤a) in the radial direction from the center of the core, and the average of variation d(α(r))/dr of the exponent along the radial direction is larger than 0.

(Samples)

Figure 4A:
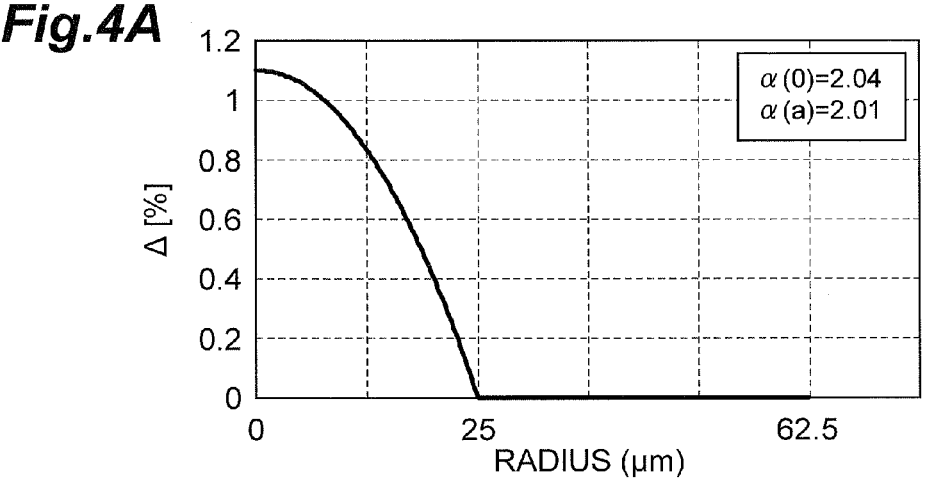
FIGS. 4A to 4C are drawings showing shape changes of index profiles in various samples against changes of the exponent α(a) at the core periphery relative to the exponent α(0) at the core center.
Figure 4B:
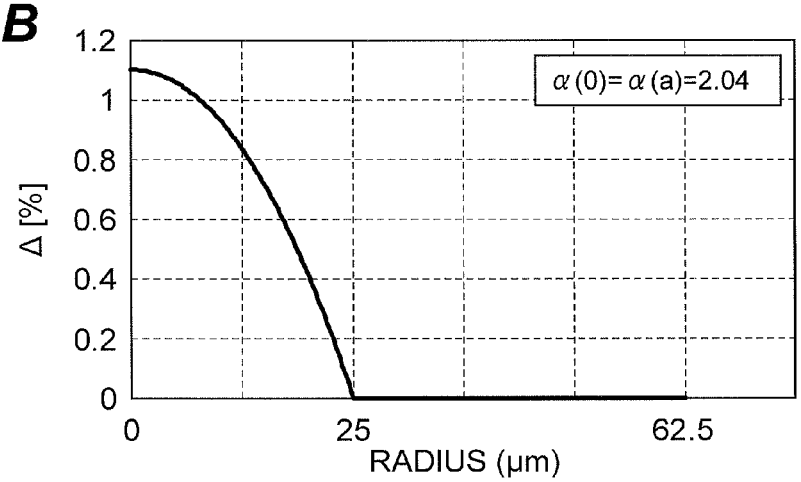
Figure 4C:
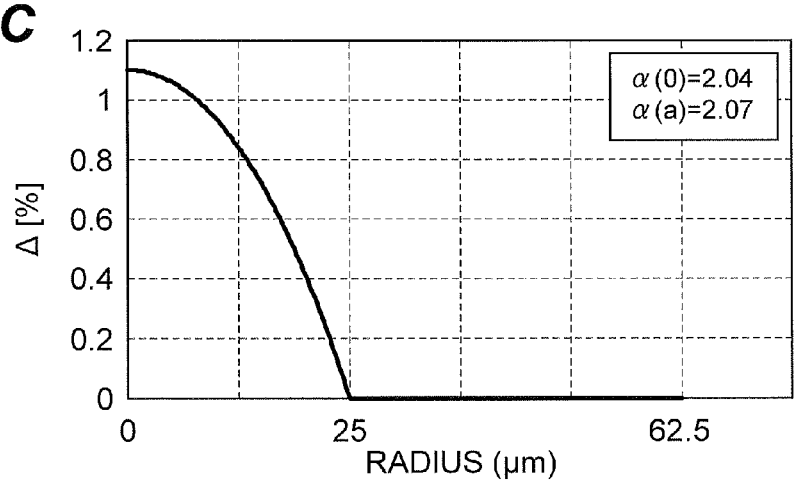

The refractive-index profiles and bandwidth characteristics of samples manufactured with change in the exponent α in each part in the core will be described below with reference to FIGS. 4A-4C, 5, and 6. FIGS. 4A to 4C are drawings showing shape changes of refractive-index profiles in various samples against changes in the exponent α(a) at the core periphery relative to the exponent α(0) at the core center. FIG. 5 is a table showing the OFL bandwidths (GHz.km) in the 850 nm band, of various samples of different combinations of the exponent α(0) at the core center and the exponent α(a) at the core periphery. FIG. 6 is a table showing minEMBc (GHz.km) in the 850 nm band, of various samples of different combinations of the exponent α(0) at the core center and the exponent α(a) at the core periphery.

These samples have the core diameter of 50 μm (from 48 μm to 52 μm) and the cladding diameter of 125 μm. The maximum relative refractive-index difference $\Delta_{core}$ at the core center (relative refractive index difference with respect to the refractive index of the cladding) is 1.1%. The samples were obtained by setting the exponent α at the core center (α(0)) and the exponent α at the position coincident with the core radius (the position of the interface between the core and the cladding) (α(r=25 μm)) and linearly approximating the exponent α(r) at an arbitrary position r as represented by Expression (11) below. Namely, the samples were manufactured as multimode optical fibers in which the exponent α monotonically changed from the core center to the core-cladding interface.

$$\alpha(r) = \alpha(0) + \frac{(\alpha(a) - \alpha(0))r}{a} = \frac{(a-r)\alpha(0) + r\alpha(a)}{a} \quad (11)$$

In the graphs of FIGS. 4A to 4C, the vertical axis represents the relative refractive-index difference Δ (%) with respect to the cladding and the horizontal axis the radius. FIG. 4A shows the relative refractive-index profile with α(0)=2.04 and α(a)=2.01, FIG. 4B the relative refractive-index profile with α(0)=α(a)=2.04, and FIG. 4C the relative refractive-index profile with α(0)=2.04 and α(a)=2.07.

FIGS. 5 and 6 show the bandwidth characteristics of the samples manufactured under the above conditions. The OFL bandwidths (GHz.km) in the 850 nm band shown in FIG. 5 mean the bandwidth characteristics of combinations of any one numerical value in the range of 2.00 to 2.07 as the exponent α(0) at the core center and any one numerical value in the range of 2.00 to 2.07 as the exponent α(25) at the position of the core radius r=25 μm (the core-cladding boundary). The bandwidths of minEMBc (GHz.km) in the 850 nm band shown in FIG. 6 also mean the bandwidth characteristics of combinations of any one numerical value in the range of 2.00 to 2.07 as the exponent α(0) at the core center and any one numerical value in the range of 2.00 to 2.07 as the exponent α(25) at the position of the core radius r=25 μm (the core-cladding boundary) as in the case of FIG. 5.

As seen from FIG. 5, a combination demonstrating the best bandwidth characteristic is the combination indicated by AR1 and combinations demonstrating the bandwidth characteristic not less than 95% of the best band characteristic are indicated by a hatched region. Similarly, as also seen from FIG. 6, a combination demonstrating the best bandwidth characteristic is the combination indicated by AR2 and combinations demonstrating the bandwidth characteristic not less than 95% of the best band characteristic are indicated by a hatched region. It is understood from either of FIGS. 5 and 6 that it is more preferable to design the refractive-index profile of the core while adjusting the exponent α so as to increase from the core center toward the outer peripheral region of the core. The same result was also obtained with the multimode optical fibers in which the maximum relative refractive-index difference Δ at the core center with respect to the cladding ($\Delta_{core}$) was in the range of 0.95% to 1.25% and the numerical aperture NA in the range of 0.195 to 0.230.

The lower limit of the exponent α to determine the shape of the refractive-index profile in the core is approximately 1.9 and the upper limit thereof approximately from 2.2 to 2.3 in general. When the exponent α is adjusted in the foregoing general numerical range (to adjust the exponent α so as to increase from the core center toward the core periphery), the initial value of the exponent α, i.e., the exponent α(0) at the core center is preferably set to not more than 2.04, in order to ensure a sufficient adjustment margin.

As described above, the present invention enables stable manufacture of the multimode optical fiber suitable for wider-band multimode transmission than before.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A multimode optical fiber comprising: a core extending along a predetermined axis and having a maximum refractive index $n_1$ and an outer diameter 2a, and a cladding provided on an outer peripheral surface of the core and having a refractive index $n_0$ ($<n_1$) at an interface to the core, wherein in a cross section of the multimode optical fiber perpendicular to the predetermined axis, the core has a refractive-index profile n(r) a shape of which is defined by an exponent α(r) that varies with a distance r (0≤r≤a) in a radial direction from a center of the core, wherein the refractive-index profile n(r) of the core is defined by Expression (1) below:

$$n(r) = n_1 \left(1 - 2\Delta_{core} \left(\frac{r}{a}\right)^{\alpha(r)}\right)^{\frac{1}{2}} \quad (1)$$

$$\text{where } \Delta_{core} = \frac{(n_1^2 - n_0^2)}{2n_1^2},$$

wherein when $\Delta_{core}$ represents a maximum relative refractive-index difference of the core and when Δ(r) represents a relative refractive-index difference of the core at a position distant by the distance r from the center of the core, the exponent α(r) is defined by Expression (2) below:

$$\alpha(r) = \frac{r\left(-\dfrac{d}{dr}\Delta(r)\right)}{\Delta_{core} - \Delta(r)} \quad (2)$$

$$\text{where } \Delta_{core} = \frac{(n_1^2 - n_0^2)}{2n_1^2} \text{ and } \Delta(r) = \frac{(n(r)^2 - n_0^2)}{2n(r)^2}, \text{ and}$$

wherein an average of variation d(α(r))/dr of the exponent along the radial direction satisfies Expression (3) below in a standard range in which the distance r is not less than 0.4 a and not more than 0.6 a $$\overline{\frac{d}{dr}\alpha(r)} > 0. \quad (3)$$

2. The multimode optical fiber according to claim 1, wherein the exponent α(0) at the center of the core is not more than 2.04.

3. The multimode optical fiber according to claim 1, wherein the average of variation of the exponent is defined by an average of variations $d(\alpha(r_i))/dr$ of the exponent at two or more arbitrary points distant by a distance $r_i$ (i is a positive integer) in the standard range from the center of the core.

4. The multimode optical fiber according to claim 1, wherein the average of variation of the exponent satisfies said Expression (3) in a range in which the distance r is not less than 0.3 a and not more than 0.7 a.

5. The multimode optical fiber according to claim 1, wherein the average of variation of the exponent satisfies said Expression (3) in a range in which the distance r is not less than 0.2 a and not more than 0.8 a.

6. The multimode optical fiber according to claim 1, wherein the outer diameter 2a of the core is not less than 48 μm and not more than 52 μm.

7. The multimode optical fiber according to claim 1, having NA of not less than 0.195 and not more than 0.230.

8. The multimode optical fiber according to claim 1, having an OFL bandwidth of not less than 1500 MHz.km in the 850 nm band.

9. The multimode optical fiber according to claim 1, having minEMBc of not less than 2000 MHz.km in the 850 nm band.

* * * * *